UNITED STATES PATENT OFFICE.

CHARLES J. GREENSTREET, OF INDIANAPOLIS, INDIANA.

NITROGENOUS FERTILIZER AND PROCESS OF MAKING SAME.

SPECIFICATION forming part of Letters Patent No. 508,220, dated November 7, 1893.

Application filed June 28, 1892. Serial No. 438,245. (No specimens.)

*To all whom it may concern:*

Be it known that I, CHARLES J. GREENSTREET, a citizen of the United States, residing at Indianapolis, in the county of Marion and State of Indiana, have invented certain new and useful Improvements in Fertilizers and Processes of Making Same from Waste Products of Fats, of which the following is a specification.

Liquids that remain after rendering lard, tallow and such fats, by means of steam heat, contain a large per cent. of proteid or albuminous substances, beside such inorganic substances as phosphates, salt, &c. These said liquids, when evaporated to dryness, have the power of absorbing moisture from the air, and when in such condition,—commonly called "stick,"—they are unfit for fertilizing purposes. My object is to convert, by simple and practical means, such "stick" into a dry, pulverulent and permanent form, without destroying any of the solids in solution. To attain this end I use a chemical compound which I prepare as follows: I take ferrous sulphate and heat in an oven until water is driven away and it has become practically insoluble in water. Of this thoroughly dried substance I take one hundred and thirty pounds and add to it twenty pounds black oxide of manganese, and while these two are being mixed I add slowly forty pounds concentrated sulphuric acid. While the mass is still wet with acid, I transfer to a furnace that is heated to 800° Fahrenheit, and bake until all sulphurous acid fumes have ceased to come off. By this means I form a chemical compound which has a most powerful effect upon "stick." In use, I take one hundred and fifty pounds of the above chemical compound, and boil in ten or twelve gallons of water until dissolved, and then permit it to run into from six hundred and fifty to seven hundred pounds of "stick" (at thirty per cent.), thoroughly mix the two, and evaporate to dryness in suitable pans or vessels at a heat not exceeding 325° Fahrenheit, and pulverize. The amount of this compound to be used depends upon the amount of solids in solution, and can be estimated by titrating a sample of the "stick" with a solution of the compound of known strength. In practice, however, the amount to be used is determined accurately enough by observation, and the proper amount is reached when the "stick" becomes of a stiff putty-like consistency, and does not feel sticky to the touch.

My compound has the power to completely precipitate the phosphoric acid, and cause the "stick," when evaporated to dryness and pulverized, to remain dry, and not have the power of again becoming deliquescent.

The important element of my compound is a salt of manganese, and any soluble salt of manganese can be used (without the addition of basic ferric sulphate if desired) preferably in the form of manganous sulphate, and this I claim prepared either in the manner above described, or in any equivalent way, for the purpose described.

Having thus fully described my said invention, what I claim as new, and desire to secure by Letters Patent, is—

1. A fertilizer composed of evaporated tank water or "stick" or such proteid or albuminous substances combined with a salt of manganese.

2. The herein described process of converting "stick" or such proteid or albuminous substances into a fertilizer by adding a soluble salt of manganese and iron, mixing said solution with the "stick" and evaporating to dryness, substantially as described.

3. The herein described non-viscid and non-deliquescent fertilizer consisting of undecomposed proteid or albuminous substances of concentrated tank-water or "stick" combined with a soluble salt of manganese and iron.

In witness whereof I have hereunto set my hand and seal, at Indianapolis, Indiana, this 25th day of June, A. D. 1892.

CHARLES J. GREENSTREET. [L. S.]

Witnesses:
 CHESTER BRADFORD,
 J. A. WALSH.